H. J. TRENHAM.
BREAKING HALTER.
APPLICATION FILED MAR. 28, 1917.
1,250,246.
Patented Dec. 18, 1917.
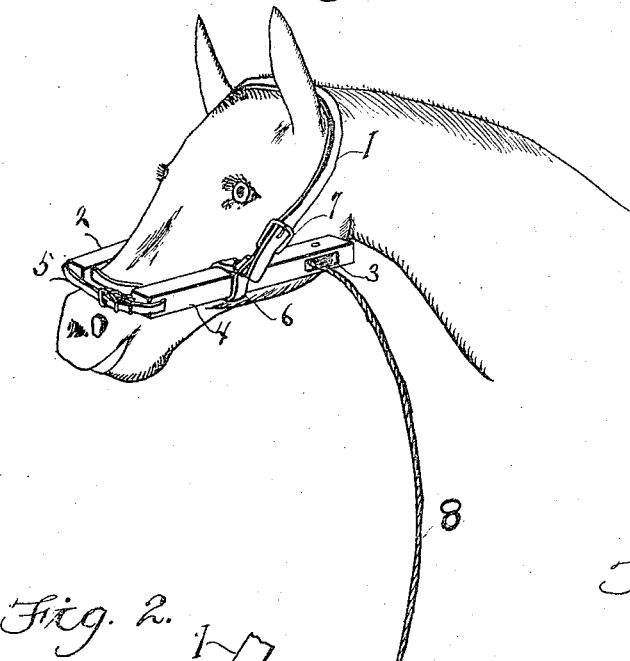
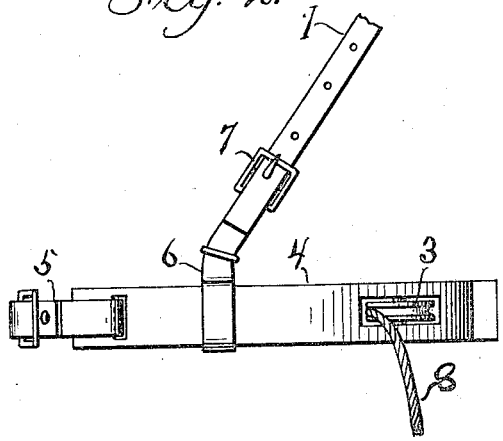
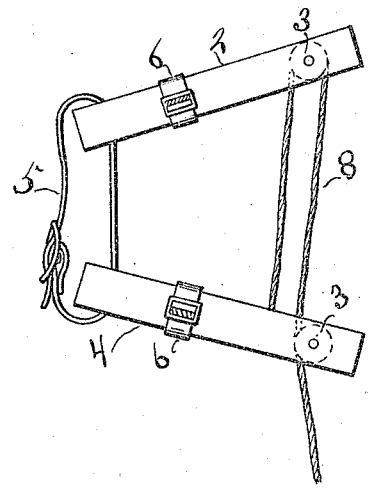

UNITED STATES PATENT OFFICE.

HOWARD J. TRENHAM, OF FORESTBURG, SOUTH DAKOTA.

BREAKING-HALTER.

1,250,246.  Specification of Letters Patent.  Patented Dec. 18, 1917.

Application filed March 28, 1917. Serial No. 157,872.

*To all whom it may concern:*

Be it known that I, HOWARD J. TRENHAM, a citizen of the United States, residing at Forestburg, in the county of Sanborn and State of South Dakota, have invented certain new and useful Improvements in Breaking-Halters, of which the following is a specification.

My invention relates to a bridle and more particularly to a bridle or halter having means for controlling a horse or like animal.

The object of my invention is to provide a device having parallel clamping bars which extend on each side of the jaws of the animal upon which it is desired to use the same.

Furthermore, the object of my invention is to provide a controlling device for a horse or similar animal, having parallel bars, adjustable across the nose of the animal and extending rearwardly along the jaws and provided with a rope run over pulley wheels, whereby the clamping bars may be drawn tightly against the side of the animal's jaws.

Finally, the object of my invention is to provide a device of the character described, which will possess advantages in points of simplicity and efficiency, consisting in the details of construction, and in the arrangement and combination of parts to be hereinafter more fully set forth and particularly pointed out in the claim.

In describing my invention in detail, references will be had to the accompanying drawing, forming part of this specification, wherein like characters denote corresponding parts in the several views and in which:—

Figure 1 is a plan view showing the device attached on the head of a horse.

Fig. 2 is a side view.

Fig. 3 is a plan view showing the clamping bars and controlling rope.

In the drawings, 1 indicates the head strap which passes over the top of the head of the animal on which my controlling device or bridle is used, and 2 indicates one of the clamping bars provided with a groove wheel pulley; 3, a pulley wheel suitably pivoted in an aperture in the end of the bar.

A second clamping bar (4) is constructed in a similar manner as that of the bar 2. The bars 2 and 4 are provided at their front end with an aperture through which is run a strap 5, the strap 5 being provided with a buckle so that the ends of the clamping bar may be adjusted to the width desired suitable for the width of the animal's face, upon which my device is being used. At approximately the longitudinal center of each clamping bar, I provide suitable attaching straps 6—6, which are provided with buckles 7 to which the head strap 1 is connected and a controlling or lead rope 8, having one end connected to the clamping bar 7, extends over the pulley 3, in the clamping bar 2 and is then run over a pulley 3, in the clamping bar 4 by which the rear ends of the clamping bars may be drawn toward each other as desired when the animal shows a disposition not to move.

In the operation or use of my device, the head strap 1 is placed over the head of the animal which it is desired to control, and the clamping bars extending parallel on each side of the jaws. The straps 5 are provided with means for adjusting the forward ends of the bars to the width of the nose of the animal, the controlling rope 8 being located in the rear of the animal's jaws. When it is desired to lead the animal, the rope 8 is held by the person having charge of the animal, and should the animal at any time, refuse to move as desired, or if it should make any attempt to break away from the person in charge, a slight pull on the rope will draw the ends of the clamping bars together, and thus clamp the jaws to such an extent as to cause the animal to come under the control of the person having it in charge.

Having fully described my invention, what I claim as new and desire to secure by Letters Patent is:—

In a device of the character described, a pair of clamping bars having adjustable means at their front ends, a head strap, means for suitably connecting the clamping bars to the head strap, pulley wheels carried by the clamping bars and a rope attached at one end, to one of said clamping bars, and run over the pulley wheel in the opposite clamping bar, whereby the ends of the clamping bars may be drawn together, as and for the purpose set forth.

In testimony whereof I affix my signature in the presence of two witnesses.

HOWARD J. TRENHAM.

Witnesses:
E. LINDEBAK,
C. A. JUDY.

Copies of this patent may be obtained for five cents each, by addressing the "Commissioner of Patents, Washington, D. C."